(12) United States Patent
Kasner

(10) Patent No.: US 6,495,259 B1
(45) Date of Patent: Dec. 17, 2002

(54) RUBBER-EPOXY BONDING VIA AN INTERFACIAL LAYER CONTAINING ACRYLATES

(75) Inventor: Alan I. Kasner, Salt Lake City, UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/433,321

(22) Filed: Nov. 3, 1999

(51) Int. Cl.⁷ .......................... B32B 27/38; B32B 27/36
(52) U.S. Cl. .................... 428/413; 428/480; 428/483; 428/500; 428/520; 428/522; 428/542.8; 156/278; 156/280; 156/313; 156/326
(58) Field of Search ................... 428/413, 500, 428/480, 483, 520, 522, 542.8; 156/278, 280, 313, 326

(56) References Cited

U.S. PATENT DOCUMENTS

| | | | |
|---|---|---|---|
| 3,344,105 A | | 9/1967 | McDonel et al. |
| 3,947,523 A | * | 3/1976 | Schaffling |
| 4,131,051 A | * | 12/1978 | Schaffling |
| 4,322,476 A | * | 3/1982 | Molari, Jr. .................. 428/412 |
| 4,421,806 A | * | 12/1983 | Marks et al. .................. 428/36 |
| 4,591,672 A | | 5/1986 | Kato et al. |
| 5,356,499 A | | 10/1994 | Decker et al. |
| 5,405,675 A | * | 4/1995 | Sawka et al. ................ 428/195 |
| 5,593,770 A | | 1/1997 | Mumford et al. |
| 5,656,703 A | | 8/1997 | Costin et al. |
| 5,763,629 A | | 6/1998 | Fan et al. |
| 5,961,902 A | * | 10/1999 | Ishitoya et al. ............. 264/45.9 |
| 6,235,363 B1 | * | 5/2001 | Bilodeau .................. 428/40.1 |

FOREIGN PATENT DOCUMENTS

| | | |
|---|---|---|
| DE | 1 594 165 | 2/1971 |
| DE | 32 33 505 A1 | 3/1984 |
| EP | 0 171 110 A1 | 2/1986 |
| EP | 0486044 A2 | 11/1991 |
| EP | 0 486 044 A2 | 5/1992 |
| GB | 1 520 172 | 8/1978 |
| JP | 62041233 A | 2/1987 |
| JP | 05279641 A | 10/1993 |
| JP | 06100840 A | 4/1994 |

OTHER PUBLICATIONS

International Search Report of Feb. 12, 2001.

* cited by examiner

Primary Examiner—Robert Dawson
Assistant Examiner—Jeffrey B. Robertson
(74) Attorney, Agent, or Firm—TraskBritt

(57) ABSTRACT

A method of bonding a rubber substrate to an epoxy resin based substrate which is particularly suitable for constructing selected components of rocket motors such as motor cases. The subject method includes disposing an acrylate between the substrates to be bonded together. The interfacial layer preferably has at least one rubber constituent and at least one acrylate therein. The disclosed method is particularly suitable for, but not limited to, bonding an unvulcanized EPDM rubber substrate to an aliphatic-type epoxy resin based composite substrate containing fibrous reinforcement elements such as graphite or carbon fibers. Upon disposing the disclosed interfacial layer between the substrates to be bonded, the substrates are preferably co-cured at an elevated temperature to complete the bonding thereof. A preferred bonding compound including at least one rubber constituent, an acrylate constituent, and an optional hydrocarbon solvent for facilitating mixing and applying the compound to form an interfacial layer between the rubber substrate and the epoxy based substrate to be bonded together is also disclosed.

43 Claims, 1 Drawing Sheet

RUBBER-EPOXY BONDING VIA AN INTERFACIAL LAYER CONTAINING ACRYLATES

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. N00030-96-G-0030 awarded by the U.S. Navy.

BACKGROUND OF THE INVENTION

1. Field of the Invention

The present invention relates generally to the bonding of rubber to epoxy resin materials and composite matrices thereof. The present invention is particularly suitable for the bonding of rubber, whether vulcanized or unvulcanized, to curable epoxy resin materials or composite matrices including curable epoxy resins therein. The present invention is especially suitable for, but not limited to, the bonding of unvulcanized synthetic rubber material to an epoxy resin based composite matrix including fibrous material to form certain components of rocket motors constructed by the aerospace industry.

2. State of the Art

Certain components of rocket motors are often constructed by laying down a composite material, or matrix of materials, usually having strength-enhancing fibers embedded in a curable epoxy resin, onto a flame-resistant and, to a certain extents thermally insulative rubber substrate. The rubber substrate and the composite matrix substrate being co-cured at an elevated temperature at a preselected pressure ideally provide a final component consisting of the rubber substrate being securely bonded to the composite matrix substrate.

An exemplary component of a rocket motor constructed in such manner is the motor case assembly which forms the main portion of the rocket motor. Typically, motor cases are constructed to have an epoxy composite exterior and a flame-resistant rubber material lining the interior of the case. In many rocket motor designs, the motor case itself is the primary portion of the rocket motor wherein the epoxy composite exterior forms a rigid skin and propellant fuel is bonded or cast onto the rubber material lining installed within the interior of the rigid skin. In addition to having suitable flame-resistant properties, motor cases must be made as lightweight and as structurally rigid as is feasible because the cases can be quite large in larger motors. Thus, constructing rocket motor cases from epoxy composite materials lined with a flame-resistant rubber material is a common practice within the art due to composite materials being able to provide all of the requisite characteristics needed for rocket motor cases while the rubber material lining provides the needed flame resistance as well as provides a suitable surface to which propellant fuel can be bonded.

In constructing thermally insulated rocket motor cases, an unvulcanized synthetic rubber material such as ethylene propylene diene monomer (EPDM) rubber compound, available from a number of commercial rubber mixing facilities, including the Burke Rubber Company for example, islinitially formed about a generally cylindrically-shaped mandrel, or tooling form, in order to provide the inner size and configuration which the motor case is to have. The use of EPDM rubber material is desired for its flame resistance and thermally insulative properties as well as its low specific gravity. In other words, EPDM rubber material is very lightweight when compared to other commercially available rubber materials. Usually EPDM rubber material is first formed about the mandrel to a desired thickness. Then, typically a composite epoxy resin matrix containing carbon, graphite, boron, aramids, or other high-strength fibrous material, in the form of fibers, tows, strands, or tapes for example, immersed in, or prepregnated with, epoxy resin is hand-laid on or wound about the outer surface of the EPDM rubber by specially designed machines to provide a motor case assembly having an inner layer or lining of rubber material and a composite outer shell. Epoxy resins particularly suitable for forming the base material of the motor case's composite outer shell are typically aromatic diglycidyl ethers of bisphenol A or F variety and include exemplary widely used epoxy resins such as: EPON 828 and 826 from Shell Chemical Company; DER 332, 383, and 661 from Dow Chemical Company; and LY 9703 from Ciba-Geigy Corporation.

European Patent Application 0 486 044 A2 filed Nov. 15, 1991, entitled Damage Tolerant Composites Containing Infusible Particles, listing Hercules Incorporated as the Assignee thereof and which reference is incorporated herein, discloses such a damage-tolerant epoxy resin matrix having high-strength filaments therein.

The epoxy resin matrix, usually containing strength-enhancing fibers therein, is laid upon the outer surface of the EPDM rubber material to form an outer shell of a desired thickness, thereby creating a motor case assembly. The motor case assembly, usually including the tooling mandrel to provide support to the motor assembly, which comprises the uncured EPDM rubber material layer and the uncured fiber reinforced epoxy resin matrix layer, is typically placed in an oven or an autoclave and co-cured at an elevated temperature and at a preselected pressure which is usually the ambient, or atmospheric, pressure. As a result of co-curing the rubber material layer and the epoxy resin layer together or, more accurately, vulcanizing the rubber layer and curing the epoxy resin layer simultaneously while the rubber substrate and the epoxy substrate are in contact with each other, a generally suitable high-strength bonding of the two substrates occurs. Upon the assembly being co-cured and thus becoming bonded together, the assembly is removed from the oven, autoclave or other curing apparatus, and the removable mandrel is removed from within the now-bonded rocket motor case assembly.

The previously described rubber materials and aromatic cured epoxy resin based composite materials generally performed adequately together in forming a suitably strong and uniform bond between the rubber substrate and the epoxy resin composite substrate. However, it was discovered when bonding EPDM rubber materials, or compounds, to aliphatic type epoxy resins that the rubber-to-aliphatic epoxy bonds did not have the same bond qualities as did the rubber-to-aromatic epoxy bonds. Aliphatic epoxies are often designed to have enhanced, or at least differing, room temperature handling characteristics when compared with aromatic epoxies. Furthermore, aliphatic epoxies are generally designed to have particularly modified viscosity-related characteristics affecting the ability of fibers to be impregnated with the aliphatic epoxy resin and to have longer shelf lives in which the prepreg material could be stored prior to being used. In order to provide such desirable qualities, aliphatic epoxies have a different chemical composition which appears to significantly negatively affect their ability to be bonded to certain rubber substrates, at least when compared to the bonding of aromatic epoxy based substrates to EPDM rubber substrates. A prepreg fiber composition including such an aliphatic epoxy that is anhydride cured is discussed in U.S. Pat. No. 5,593,770, issued to Mumford et al. and entitled Chemorheologically Tailored Matrix Resin Formulations Containing Anhydride Curing Agents. The '770 patent is a continuation-in-part of U.S. Pat. No. 5,356,499, issued to Decker et al. and entitled Method For Increasing Fiber Strength Translation In Composite Pressure Vessels Using Matrix Resin Formulations Containing Surface Acting Agents, directed to a method for improving the strength of composite pressure vessels incorporating chemorheologically viscosity tailored epoxy resin formulations having certain viscosity characteristics. Both of these patents are incorporated by reference herein.

U.S. Pat. No. 5,656,703, issued to Costin et al. and entitled Coating Composition of Epoxy Resin, Metal Di(Meth)Acrylate and Poly(Meth)Acrylate, discloses a curable coating composition containing an epoxy resin, a polymethacrylate, and a metal salt to improve adhesive characteristics: of a coating on a substrate, but does not offer any teachings, or suggestions, directed to bonding substrates of differing materials together, such as rubber being bonded to an epoxy resin based substrate.

U.S. Pat. 5,763,629, issued to Fan et al. and entitled Alkoxylated Glycidyl (Meth)Acrylates and Method of Preparation, is directed to a class of monomers containing epoxide functionalities wherein epoxidation of the monomers makes use of an organic solvent such as a hydrocarbon-based solvent, but does not offer any teachings, or suggestions, directed to bonding substrates of differing materials together such as rubber being bonded to an epoxy resin based substrate.

During testing, the bonds between EPDM rubber and aliphatic epoxies in particular seemed to lack sufficient adhesive strength when compared to bonds between the previously mentioned aromatic epoxies and EPDM rubber. For example, upon tensile testing of a test sample, the bond between an EPDM rubber substrate and an aliphatic anhydride-cured epoxy based composite material (which had been co-cured as discussed previously) would suffer an adhesive failure. That is, the test sample would pull apart at the bond line, or at the interface the rubber material and the aliphatic epoxy based composite material instead of preferably cohesively failing wherein either the rubber material or the composite material would be pulled apart from itself. In this particular case, it would be expected that the rubber material, having relatively lower tensile and shear strength ratings, would cohesively fail before the composite matrix material, having relatively higher tensile and shear, strength ratings, if an adhesive failure at the bond line did not occur first.

For a variety of reasons and notwithstanding the above-discussed test results, the use of aliphatic or cylcoaliphatic epoxy resins, generally referred to as aliphatic epoxy resins such as the epoxy resin disclosed in previously referenced U.S. Pat. No. 5,593,770—Mumford et al., offers certain advantages in certain applications over aromatic epoxy resins. Furthermore, the use of aliphatic epoxy resins, or aromatic epoxies having poor bonding characteristics, may be required by the product specifications issued in connection with a contract, thus leaving few choices for the contracting party making a given product other than to perhaps seek approval or recertification for bond-enhancing additives to be included in the specified rubber material and/or be included in the specified aliphatic epoxy resin based matrix, or both, to enhance the bond therebetween. However, as a practical matter it would be time consuming and costly for the contracting party to identify and then seek approval and re-certification of either or both substrates to be formulated to include such bond-enhancing additives to achieve acceptable bond strengths.

One alternative considered by the inventor of the present invention included cold bonding the vulcanized rubber material to the cured aliphatic epoxy resin matrix. However, this particular alternative introduces several additional processing steps leading to increased complexity and manufacturing costs. Moreover, when cold bonding it is often difficult to reliably obtain a sufficiently strong bond when bonding substrates having low surface energies. This problem is partly due to it not always being possible to ensure full-contact interfaces, wherein an adhesive can fully and uniformly be applied between the rubber material and the epoxy resin matrix.

Another alternative considered by the inventor of the present invention was the use of commercially available adhesives such as Chemlock 234 and Chemlock 236 available from the Lord Corporation. But these adhesives, as with most, high-strength, high-temperature resistant adhesives in general, usually contain certain solvents or blends of solvents requiring special handling techniques and precautions to ensure safety and compliance with environmental restrictions.

Another problem identified with using known adhesives is that such adhesives are often formulated to bond a number of different types of substrates together and hence may have a number of active ingredients. For example, a candidate adhesive might be formulated for bonding metals, ceramics, glass, and plastics, etc., and thus have a plurality of active ingredients, wherein each active ingredient is particularly suitable for bonding a particular material. However, when using such adhesives having multiple active ingredients, there is a concern as to what effect each of the active ingredients will have on the bond strength. That is, one or more of the extraneous active ingredients may actually decrease the bond strength of the bond provided by the particularly suitable active ingredient with respect to the base materials being bonded. Furthermore, when using adhesives having multiple active ingredients, there is always a concern as to potential or actual adverse effects each of the multiple active ingredients, whether acting individually or in combination with one or more of the other ingredients, could have on the structural, durability, longevity, performance, and compatibility properties of the base materials to be bonded.

Upon investigations, and in some cases tests, the preceding alternatives were deemed unattractive or not acceptable. For example, inferior bond strengths were evidenced by test samples failing adhesively instead of cohesively, i.e., at the bond interface between two substrates instead of one of the substrates being pulled apart from itself. Other factors making the above alternatives unattractive or unacceptable included associated increased material costs and/or manufacturing costs, potential adverse environmental impacts, and concerns as to whether a readily available adhesive being applied between the two materials would significantly alter the properties of one or both of the materials. If a significant property change of either substrate were at all suspected, substantial product testing would have to be conducted to ensure that product durability, performance and life expectancies were not negatively affected.

Thus, it can be appreciated that there is a need within the art for a method of bonding rubber materials to epoxy resin materials wherein the resulting bond is consistently durable, reliable, of a suitable quality, and in which manufacturing costs and potentially adverse environmental factors associated with such a method are kept to a minimum.

It can be further appreciated that there is a need within the art for a method of bonding rubber materials to epoxy resin materials in which there are no substantial changes resulting to the properties of the two materials to be bonded together.

Another need within the Art is for a method of bonding rubber materials to epoxy resin materials to form selected components of rocket motors without unduly adding to the cost of manufacturing such motors by having to have certain solvents on hand which typically require special handling techniques when using such solvents and which typically require certain precautions be taken when storing and disposing such solvents.

A yet further need within the art is the ability to bond an unvulcanized synthetic rubber substrate to an aliphatic epoxy resin based composite substrate reliably and consistently, which is known to be particularly difficult to achieve.

A still yet further need within the art is the ability to bond rubber materials to epoxy resin based composite materials having reinforcing fibrous elements therein, such as carbon fibers, graphite fibers, and boron fibers, aramid fibers, typically provided in the form of tapes, woven fabrics, mats, tows, and windable filaments, for example.

SUMMARY OF THE INVENTION

The present invention includes a method of constructing certain components of rocket motors such as thermally insulated composite motor cases. Preferably, the case is constructed of an outer, or exterior, shell formed of an aliphatic epoxy resin based, carbon fiber reinforced composite material in which a heat resistant EPDM rubber based material, or compound, is bonded to an inner surface of the outer composite shell via an interfacial layer. Preferably, the bonding is achieved by vulcanizing the rubber material and curing the epoxy resin based material simultaneously at an elevated temperature and at a preselected pressure. The present invention further provides a bonding compound preferably including at least one rhono-functional or polyfunctional acrylate such as glycidyl methacrylate, trimethylolpropane trimethacrylate, and pentaerythritol triacrylate, mixed with a selected amount of EPDM rubber material, or compound. Such EPDM rubber material, or compound, could be taken from the same batch used in forming the rubber substrate to be bonded, or the EPDM rubber material could be formulated to the same specifications as the rubber substrate to be bonded. Alternatively, the rubber constituent of the bonding compound could merely be a rubber material or rubber compound that is the same or similar to the rubber or rubber compound used in forming the substrate to be bonded. An optional solvent, preferably comprising at least one hydrocarbon such as a terpene, to facilitate mixing the bonding compound and for disposing the compound on one or more of the substrates to be bonded to form an interfacial layer therebetween, may be added to the compound. The optional solvent evaporates after application, thereby providing an interfacial layer of dry residual material. Preferably, the percentage of rubber and percentage of acrylate on a weight basis ranges from approximately 95% rubber and 5% acrylate to approximately 5% rubber and 95% acrylate, with a percentage of approximately 40% rubber and a percentage of approximately 60% acrylate, producing a bonding compound which yields very favorable results. However, higher and lower concentrations of rubber and acrylate, each ranging from 0% to 100% respectively, with a trace of acrylate, with or without the use of a solvent, may be used in Accordance with the present invention.

Although the present invention is particularly suitable for bonding an unvulcanized EPDM rubber substrate to an aliphatic anhydride-cured, epoxy resin based composite substrate having carbon fibers therein to form a rocket motor case, it is not limited to such. The introduction of an interfacial layer containing at least one acrylate can be used in the bonding of a wide variety of rubber substrates to a wide variety of epoxy resin based substrates to form a wide variety of products, articles, or assemblies. For example, the rubber substrate to be bonded may be a natural rubber, a synthetic rubber, or it may be unvulcanized, or it may have been previously vulcanized. Likewise, the epoxy resin based substrate can be an aromatic epoxy resin and need not be an aliphatic epoxy resin.

DETAILED DESCRIPTION OF THE INVENTION

Figure 1:
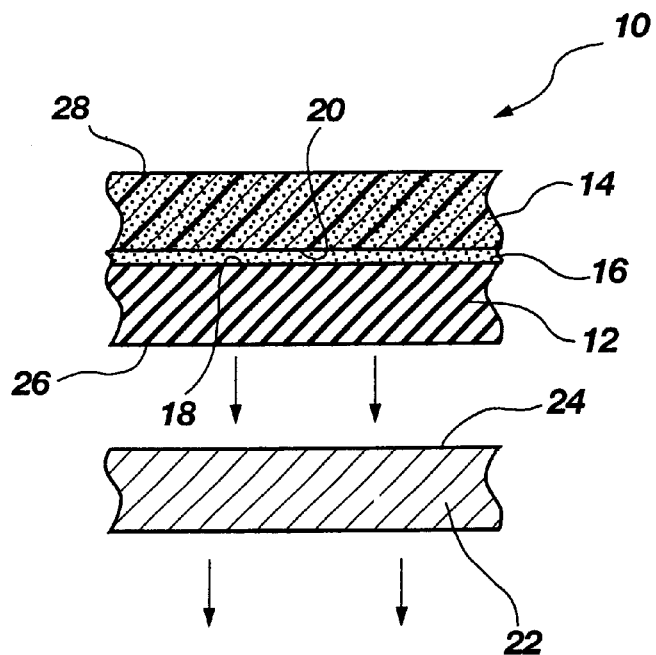
FIG. 1 is an isolated cross-sectional view of an exemplary first rubber substrate bonded to an exemplary second epoxy resin based composite substrate via an interfacial layer containing an acrylate in accordance with the present invention.

FIG. 1 of the drawing is an isolated cross-sectional view of an exemplary article, or product, 10 having a first substrate 12 of a preselected rubber material bonded to a second substrate 14 of a preselected epoxy resin based material via an interfacial layer 16 having an acrylate therein. Interfacial layer 16 is disposed between rubber substrate 12 and epoxy resin based substrate 14 so as to contact and fully wet, to the extent possible or feasible, bonding surface 18 of rubber substrate 12 and surface 20 of epoxy resin based substrate 14.

Figure 2:
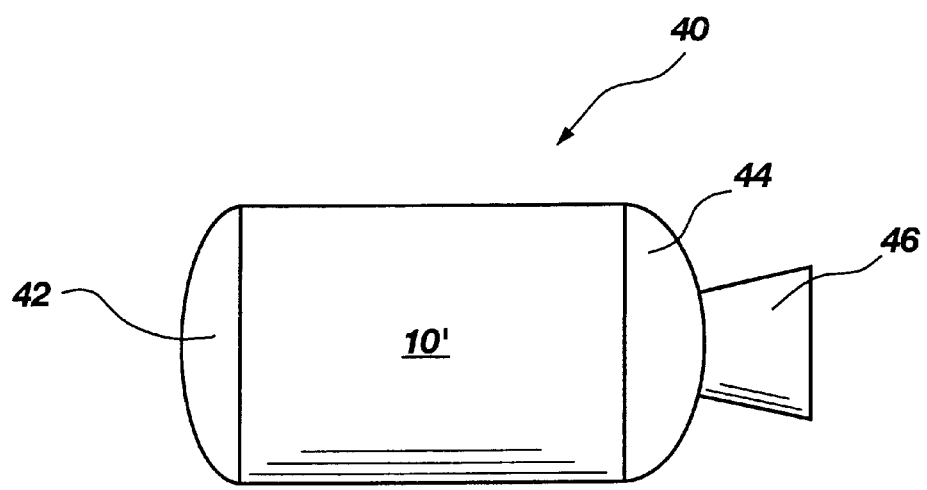
FIG. 2 is a front view of an exemplary rocket motor having a motor case embodying the present invention.

Article, or product, 10 as illustrated could, or example and without limitation, be a hollow, generally cylindrically shaped rocket motor case 10' forming a significant portion of solid-propellant rocket motor 40, also referred to as a rocket motor assembly, as shown in FIG. 2. Exemplary rocket motor assembly 40 includes a forward dome 42, an aft dome 44, and an exit cone 46. However, it should be appreciated that although the present invention is particularly suitable for constructing rocket motor cases, other components of a rocket motor or any article in which a rubber based substrate is to be bonded to an epoxy resin based substrate could be constructed in accordance with the present invention.

With respect to constructing a rocket motor case in accordance with the present invention, preferably rubber substrate 12 is initially an unvulcanized EPDM rubber compound, commercially available from a number of rubber-mixing companies such as Burke Rubber Company, and epoxy resin based substrate 14 is preferably a yet-to-be cured aliphatic epoxy resin based composite material having carbon or graphite fibers, for example, therein, such as disclosed in previously referenced U.S. Pat. No 5,593,770, issued to Mumford et al. and commercially available from Thiokol Propulsion, a division of Cordant Technologies, Inc.

Rubber substrate 12 is first laid down, or preformed, in a manner known within the art. With respect LO constructing a motor case, it is preferred that EPDM rubber substrate 12, i.e., an EPDM rubber material, or compound, be disposed about a lay-down surface 24 of a tooling mandrel, or form, 22 configured to provide the internal size and shape which the inner surface of rubber substrate 12 is to have. Rubber substrate 12 may also contain silica, usually in the form of particles, and/or fibers such as aramid fibers, or a variety of other elements or fillers therein. Mandrel 22 is typically formed of an aluminum or other metal and is designed to be collapsible by loosening or disassembling key members or portions of the tools so that in due course, lay-down surface 24 can be retracted from inner surface 26 of rubber substrate 12 and thereafter mandrel 22 can be removed from the interior of the hollow generally cylindrical rocket motor case 10.

Upon rubber substrate 12 being laid down on lay-down surface 24, preferably interfacial layer 16 having at least one acrylate, commercially available from a number of chemical companies such as Sartomer Company, is disposed upon bonding surface 18 of rubber substrate 12. Preferably, a quantity of EPDM rubber compound having identical or nearly identical material properties to the EPDM rubber material of which rubber substrate 12 is made, such as from the same batch of material for example, or as a practical matter preferably being essentially the same with respect to chemical composition and having been subjected to the same formation steps, is mixed with terpene to the extent desired for facilitating mixing and spreading of the interfacial composition. However, the rubber compound to be included in the interfacial composition does not need to be of exactly the same formulation in which the substrate rubber is formed and may, for example, be similar, or a chemically compatible polymer maybe used in forming the rubber substrate material. Rubber substrate materials or compounds in addition to the base polymer or polymers, typically will have various amounts of tackifiers, fillers, curatives, and other ingredients however these various substances are not necessarily required to be present in the rubber or polymers used in forming the interfacial compound. Furthermore, generally similar rubbers/polymers, or even remotely related rubbers/polymers compared to the rubber/polymer used in forming the rubber substrate, could be used in forming the interfacial compound, but the effectiveness of the bond provided by the present invention may be compromised. It should be understood that, to the extent a solvent is used, if any, is not an active ingredient, and a terpene, or a terpene derivative, is but one solvent that is particularly suitable for use in connection with the present invention. Terpene is preferred as it has many favorable characteristics such as being non-toxic, having low flammability, and having low volatility, thereby making it relatively easy to handle and approved for being present in work areas in which rocket motors are being constructed. Alternative solvents include any aliphatic or aromatic hydrocarbon such as xylene, naphtha, petroleum distillates, low molecular weight alkanes or any other similar organic solvent. Also, a chlorinated solvent such as tetrachloroethylene (TCE) could be used. Care should be exercised when selecting a solvent however, as many hydrocarbon solvents are flammable, are toxic, and have high volatility, thereby complicating the storage, handling, and disposal of such solvents and thereby detracting from one of the benefits offered by the present invention of avoiding difficult-to-handle chemicals in the work area in which rocket motors are present.

After mixing a quantity of rubber material with terpene as a solvent, an acrylate is then added to form the interfacial bonding compound. The term acrylate is used herein to include any mono-functional or poly-functional chemical derivative, produced by a reaction such as esterfication of an acrylic acid or a substituted acrylic acid such as methacrylic acid. The following acrylates are particularly suitable for use in forming the interfacial bonding compound of the present invention: glycidyl methacrylate; trimethylolpropane trimethacrylate; and pentaerythritol triacrylate. It is believed other acrylates would be equally as effective. Although the particular preceding three acrylates were mixed into the rubber, and optional solvent, on an individual basis and performed generally equally well during testing, one or more of the preceding preferred three acrylates, as well as other acrylatles could be combined and used to form an interfacial compound in accordance with the present invention.

During testing of the present invention, three separate interfacial bonding compounds were formed to provide three different interfacial layers. Thus, after the terpene had evaporated, the three interfacial layers respectively had 28.5%, 61.5%, and 100% by weight of acrylate with the remainder, with the exception of the 100% acrylate interfacial layer, comprising EPDM rubber having the same formulation as the rubber substrate. That is to form an interfacial layer having a 28.5% by weight acrylate, a bonding compound consisting of: 12.5 grams of EPDM rubber compound (7 grams EPDM rubber and 5.5 grams other ingredients); 87.5 grams of terpene; and 5 grams of acrylate was mixed together. To form an interfacial layer having 61.5% by weight acrylate, a bonding compound consisting of: 12.5 grams of EPDM rubber compound (7 grams of EPDM rubber and 5.5 grams other ingredients); 87.5 grams of terpene; and 20 grams of acrylate was mixed together. In the case of the 100% acrylate, no EPDM rubber compound or terpene was added to form the bonding compound. It should be understood that more or less terpene, or other solvent could be used, but the above amount of solvent worked well in facilitating the disposal of the interfacial layer onto the rubber substrate.

After the three separate interfacial bonding compounds had been prepared, each of the three interfacial compounds, or cements, was used to form an interfacial layer, such as interfacial layer 16, between a substrate of EPDM rubber compound, such as substrate 12, and an aliphatic epoxy resin based composite substrate having graphite fibers therein, such as substrate 14, as depicted in the drawings. Also present in the EPDM rubber compound used as the rubber constituent in two of the three test compounds was peroxide, not exceeding 5% of the rubber weight, some tackifier, some fiber, some filler, and other additional ingredients present to an even lesser extent. These additional ingredients, including the peroxide, are not considered essential ingredients, and contribute little, if any, to the quality of the bond to be formed between the substrates to be bonded when incorporating the interfacial layer in accordance with the present invention. However, these ingredients were formulated into the rubber used in the test bonding compounds, due to it being the same rubber formulation of which the tests substrates were formed. The tests results revealed that with respect to the three variously proportioned acrylate-containing compounds the best bonds were achieved when using the 61.5% level of acrylate in the interfacial layer, with the second best bonds occurring when using the 28.5% level of acrylate in the interfacial layer, and the third best bonds occurring when using 100% acrylate in the interfacial layer. Of interest is that the bonds wherein the interfacial layer was 100% acrylate provided very acceptable bond characteristics, although the zone of the interfacial layer was quite thin when compared to interfacial layers in which rubber was present in addition to acrylate. In the case wherein 100% acrylate was used, the interfacial layer was formed in-situ, and there was not clear demarkation of an interfacial layer per se, because the acrylate diffused into the top layer of the rubber substrate to a depth of approximately 0.040 inches (1 mm).

In order to practice the present invention, the following general guidelines are offered. After mixing the constituents of the proportioned acrylate-containing compound to be used to form interfacial layer 16, the compound is brushed, rolled, or otherwise disposed onto bonding surface 18 by any suitable method known in the art to form interfacial layer 16. Additional solvent may be added to the composition, or less solvent may be used when initially creating the composition, as needed to enhance workability and spreadability. In some cases, the provision of solvent in the compound used to form interfacial layer 16 may not be required at all. Preferably, the interfacial layer 16 is allowed to air dry to remove all or most of the solvent by evaporation. With the above rubber-to-acrylate and rubber-to-solvent weight proportions, in the most favorable case, the resulting test compounds were acrylate-rich and each of the acrylates contributed approximately 61.5% of the total dry weight of their respective interfacial layers.

Upon the acrylate-containing compound having preferably been applied to bonding surface 18 to form an interfacial layer 16, and upon the evaporation of the solvent an aliphatic-type epoxy resin based substrate 14, can next be provided, or disposed onto the interfacial layer 16 to form the outer shell of motor case 10'. Epoxy resin based substrate 14 can be provided preferably with reinforcement fibers such as carbon, graphite, boron, fiberglass, aramid, or any other similar strength-enhancing materials, either as fibers or in tow, fabric, cloth, mesh, or stranded form. Furthermore, the epoxy resin could be provided in the form of a fibrous prepreg in which the epoxy resin is pre-impregnated into the fibrous material and the fibrous material epoxy resin is then wrapped, or wound, about the top-most surface of interfacial layer 16, which was previously disposed onto bonding surface 18 of rubber substrate 12, either by hand or by specially designed automated machinery known and used within the art resulting in surface 28 being exposed.

After rubber substrate 12, interfacial layer 16, and epoxy based resin substrate 14 have been respectively disposed about mandrel 22, the yet-to-be cured assembly is preferably placed into an oven or autoclave. The assembly is then cured by raising the temperature within the oven or autoclave to a temperature of approximately 290° F. (144° C.) over a preselected amount of time, usually many hours, while preferably maintaining atmospheric pressure. However, particularly suitable oven or autoclave temperatures, pressures, and times will vary depending on the individual properties of the materials forming substrates 12, 14, the compound forming interfacial layer 16, and the geometry and size of case assembly 40.

It is preferred, but not required, that rubber substrate 12 be in an unvulcanized state, and epoxy resin based substrate 14 be in an uncured state when the assembly is placed in the autoclave. Alternatively, rubber substrate 12 could be partially but not fully vulcanized, and/or epoxy resin based substrate 14 could be partially but not fully cured prior to being placed in the oven or autoclave. Alternatively, rubber substrate 12 could be partially but not yet fully vulcanized, and/or epoxy resin based substrate 14 could be partially but not yet fully cured prior to being placed in an oven or autoclave. Furthermore, rubber substrate 12 could be fully vulcanized, and/or epoxy resin based substrate 14 could be fully cured prior to being placed in the oven or autoclave, but the effectiveness of providing an interfacial layer in accordance of the present invention could be reduced in the later two cases. Therefore, to provide the best results, each substrate is preferably in an unvulcanized/uncured state, with it being understood that the term "cure" is often used interchangeably within the art to designate the cross-linking of rubber, i.e., vulcanization, and the cross-linking of epoxies, i.e., curing. The benefits accorded by using the interfacial layer of the present invention are maximized because, upon the assembly being co-cured as a single assembled workpiece by way of being subjected to elevated temperatures within an oven, autoclave, or similar apparatus, the resulting bond between the respective bonding surfaces of the substrate will be optimized by way of the interfacial layer providing a hard substrate-to-a soft substrate interface while the co-curing process is being conducted in the autoclave. Also, it is inherently more efficient to have but a single curing step to cure each substrate simultaneously in lieu of curing each substrate separately or in a consecutive fashion, which would increase manufacturing costs in the form of increased labor and costs associated with operating autoclaves, provided oven or autoclave availability is not an issue due to production scheduling conflicts.

After the assembly has been cured in an oven, an autoclave, or similar apparatus, the assembly is removed therefrom and the collapsible, or breakdown mandrel 22 can be removed from the interior of the now fully cured substrates 12 and 14 which comprise exemplary motor case 10'. Motor case 10' can then be further processed and readied as required to complete the construction of a rocket motor.

In general, the bonding of epoxy resin based substrate 14 and rubber substrate 12 via the interfacial layer 16, is effected by a combination of two mechanisms. The first mechanism depends on cured interfacial layer 16 serving to redistribute stress on the bond line between the bonding surfaces 18 and 20, and reduce peak stresses during loading of cured assembly 40. The second mechanism depends on adequately wetting bonding surfaces 18 and 20 by interfacial layer 16. Adequate wetting is responsible for intimate contact between interfacial layer 16, and the two bonding surfaces 18 and 20 during curing of the assembly 40. This intimate contact gives rise to a strong adhesive bond as epoxy resin based substrates 14, interfacial layer 16, and rubber substrate 12 cure simultaneously. This adhesion takes place via either covalent bonds and/or dispersion forces. The greater the extent to which the bonding surfaces can be wetted by interfacial layer 16 before and during the curing process, the greater the probability of a stronger, more secure bond. The degree of wettability is influenced by the solubility parameter and the polarity of interfacial layer 16 which, in turn, is dependent on the type and amount of acrylate used in forming the compound of interfacial layer 16. The selection of the kind and the amount of acrylate mixed into the compound forming interfacial layer 16 is crucial to guarantee and maximize this wetting.

For example, if essentially no acrylate was added to the interfacial compound, i.e., if the interfacial compound were to comprise nearly 100% rubber, or rubber and a selected amount of solvent, the rubber substrate or, more specifically, the bonding surface of the rubber substrate would essentially be perfectly wetted by the interfacial layer while the epoxy resin based substrate or, more precisely, the bonding surface of the epoxy resin based substrate would be wetted very little, if at all. Conversely, if essentially no rubber were added to the interfacial compound, i.e., if the interfacial compound were to comprise 100% acrylate, or essentially 100% acrylate, or a mixture of acrylate and solvent, the bonding surface of the epoxy resin based substrate would essentially be perfectly wetted while the bonding surface of the rubber substrate would be poorly wetted, if at all. Generally speaking, the greater the amount of acrylate present in the interfacial layer, the better the bond between the interfacial layer and the bonding surface of the epoxy resin based substrate, while the greater the amount of rubber present in the interfacial layer, the better the bond between the interfacial layer and the bonding surface of the rubber substrate. Thus, an interfacial compound having an optimized rubber/acrylate ratio is desired for each rubber/epoxy combination in order to obtain the ultimate bond strength possible, which is evidenced by the load in which bonded test substrates fail and whether such failure is a cohesive failure or an adhesive failure as previously described.

Because the effectiveness of the interfacial layer quickly diminishes when the proportion of rubber to acrylate in the interfacial layer is at an extreme, i.e., 0% or near 0% rubber and 100% or near 100% acrylate, and conversely 100% or near 100% rubber and 0% or near 0% acrylate, most favorable results are obtained when the compound forming the interfacial layer has a total rubber-to-acrylate weight proportion ranging between about 95% rubber and about 5% acrylate to about 5% rubber and about 95% acrylate. Very favorable results are obtainable when the compound forming the interfacial layer has a rubber-to-acrylate weight proportion of about 40% rubber and about 60% acrylate as evidenced by tests on samples wherein the test samples had an interfacial layer of approximately 61.5% acrylate and 39.5% EPDM rubber. That is, the interfacial layer after the terpene solvent has evaporated has approximately 40% by weight of rubber and approximately 60% by weight of acrylate to provide the most favorable bond strength values and failure characteristics when bonding initially unvulcanized EPDM rubber to an initially uncured aliphatic epoxy resin based graphite fiber composite substrate.

Test samples formed of an EPDM rubber substrate and an aliphatic epoxy resin based substrate which had been bonded together without the interfacial layer of the present invention tended to fail in tension when stressed between 200 to 450 psi (1387 to 3102 kPa), with the failures being adhesive type failures and not the desired cohesive type of failures. Identical test samples which had been bonded together with an interfacial layer in accordance with the present invention tended to fail in tension when stressed between 500 to 700 psi (3447 to 4825 kPa), with the failures being of the desired cohesive type of failure.

Although the present invention has been described in the context of constructing a rocket motor case preferably comprising bonding an initially unvulcanized EPDM rubber substrate to an initially uncured aliphatic epoxy resin based composite substrate via disposing therebetween at least one acrylate preferably contained in an interfacial layer having a selected amount of EPDM rubber material, acrylate, and terpene as a solvent, it should be understood that the present invention may be used in connection with the construction of other rocket motor components, or any product, or article comprising at least two substrates to be bonded together.

Additionally, it should appreciated that one or both of the substrates to be bonded may be precured prevulcanized, prior to introducing an interfacial layer as described therebetween. Furthermore, candidate substrates to be more effectively bonded need not be of such differing materials known to be very difficult to bond, but could be substrates which are known to be more easily bonded together, yet which could realize benefits and curing efficiencies offered by the present invention. For example, an EPDM rubber substrate could readily be bonded to an aromatic epoxy resin based substrate, such as disclosed in previously referenced European Patent Application 0486 044 A2, in accordance with the teachings of the present invention. It is also possible to bond like-material substrates to each other via an interfacial layer as described, if so desired. For example, a rubber substrate could be bonded to another rubber substrate via an interfacial layer as described herein, or an epoxy based substrate could be bonded to another epoxy based substrate via an interfacial layer as described herein, with or without the use of a solvent to aid in the mixing and application of the compound, to provide an interfacial layer between the substrates to be bonded, preferably by co-curing.

Moreover, an unvulcanized natural rubber could be used as a constituent when creating the compound to form an interfacial layer to be disposed between an unvulcanized synthetic rubber subtrate, vice versa, and a preselected uncured epoxy based substrate wherein the interfacial layer effects a bond between the substrates upon being co-cured.

Thus, it is to be understood and appreciated by those skilled in the art that the present invention as defined by the following claims is not to be limited by the particular details set forth in the above-detailed description as many variations thereof are possible without departing from the spirit and scope of the present invention as claimed.

What is claimed is:

1. A component of a rocket motor, comprising:
  a first substrate comprising at least one rubber material;
  a second substrate comprising an epoxy resin; and
  an interfacial layer comprising at least one acrylate disposed between at least a portion of the first substrate and at least a portion of the second substrate, wherein at least a portion of the at least one acrylate is diffused into at least a portion of the at least one rubber material of the first substrate.

2. The component of claim 1, wherein the interfacial layer further comprises at least one rubber constituent.

3. The component of claim 1, wherein:
  the interfacial layer is interspersed between at least a portion of a selected bonding surface of the first substrate and at least a portion of a selected bonding surface of the second substrate.

4. The component of claim 1, wherein:
  the first substrate and the second substrate are cured to bond the first substrate and the second substrate via the interfacial layer.

5. The component of claim 4, wherein the at least one rubber material of the first substrate comprises a synthetic rubber.

6. The component of claim 4, wherein the at least one rubber material of the first substrate comprises ethylene propylene diene monomer (EPDM) rubber.

7. The component of claim 4, wherein the epoxy resin of the second substrate comprises an aliphatic epoxy resin based composite material.

8. The component of claim 4, wherein the epoxy resin of the second substrate comprises an epoxy resin based composite material having fibrous elements therein.

9. The component of claim 4, wherein the first substrate further comprises at least one of the group consisting of silica and an aramid.

10. The component of claim 2, wherein the interfacial layer comprises:

the at least one rubber constituent selected from the group consisting of a synthetic rubber and a natural rubber; and the at least one acrylate selected from the group consisting of a mono-functional acrylate, a poly-functional acrylate, an acrylate derivative, a methacrylate, glycidyl methacrylate, trimethylolpropane trimethacrylate, and pentaerythritol triacrylate.

11. The component of claim 4, wherein the interfacial layer comprises the at least one rubber constituent and the at least one acrylate, each present in a preselected percentage by weight relative to the total amount of the at least one rubber constituent and the at least one acrylate.

12. The component of claim 11, wherein the preselected percentage by weight of the at least one rubber constituent to the at least one acrylate of the interfacial layer ranges from approximately 95% rubber constituent and approximately 5% acrylate to approximately 5% rubber constituent and approximately 95% acrylate.

13. The component of claim 11, wherein the preselected percentage by weight of the at least one rubber constituent to the at least one acrylate ranges from approximately 30% rubber constituent and approximately 70% acrylate to approximately 70% rubber constituent and approximately 30% acrylate.

14. The component of claim 13, wherein the at least one rubber material of the first substrate comprises an unvulcanized ethylene propylene diene monomer (EPDM) rubber and the epoxy resin of the second substrate comprises an aliphatic epoxy resin based composite material including fibrous elements therein.

15. A motor case forming at least a portion of a rocket motor, comprising:
a first inner insulative substrate comprising at least one flame resistant rubber;
a second exterior substrate comprising an epoxy resin; and
an interfacial layer comprising at least one acrylate disposed between at least a portion of the first substrate and at least a portion of the second substrate, wherein the interfacial layer bonds the first substrate to an inner surface of the motor case.

16. The motor case of claim 15, wherein the interfacial layer further comprises at least one rubber constituent.

17. The motor case of claim 15, wherein:
the interfacial layer is interspersed between at least a portion of a selected bonding surface of the first substrate and at least a portion of a selected bonding surface of the second substrate.

18. The motor case of claim 15, wherein:
the first substrate and the second substrate are cured to bond the first substrate and the second substrate via the interfacial layer.

19. The motor case of claim 18, wherein the at least one flame-resistant rubber of the first substrate comprises a synthetic rubber.

20. The motor case of claim 18, wherein the at least one flame-resistant rubber of the first substrate comprises ethylene propylene diene monomer (EPDM) rubber.

21. The motor case of claim 18, wherein the epoxy resin of the second substrate comprises an aliphatic epoxy resin based composite material.

22. The motor case of claim 18, wherein the epoxy resin of the second substrate comprises an epoxy resin based composite material having fibrous elements therein.

23. The motor case of claim 18, wherein the first substrate further comprises at least one of the group consisting of silica and an aramid.

24. The motor case of claim 16, wherein the interfacial layer further comprises:
the at least one rubber constituent selected from the group consisting of a natural rubber and a synthetic rubber; and
wherein the at least one acrylate is selected from the group consisting of a mono-functional acrylate, a poly-functional acrylate, an acrylate derivative, a methacrylate, glycidyl methacrylate, trimethylolpropane trimethacrylate, and pentaerythritol triacrylate.

25. The motor case of claim 16, wherein the at least one rubber constituent and the at least one acrylate of the interfacial layer are each present in a preselected percentage by weight relative to the total amount of the at least one rubber constituent and the at least one acrylate.

26. The motor case of claim 25, wherein the preselected percentage by weight of the at least one rubber constituent to the at least one acrylate of the interfacial layer ranges from approximately 95% rubber constituent and approximately 5% acrylate to approximately 5% rubber constituent and approximately 95% acrylate.

27. The motor case of claim 25, wherein the preselected percentage by weight of the at least one rubber constituent to the at least one acrylate of the interfacial layer ranges from approximately 30% rubber constituent and approximately 70% acrylate to approximately 70% rubber constituent and approximately 30% acrylate.

28. The motor case of claim 27, wherein the at least one flame-resistant rubber of the first substrate comprises an unvulcanized ethylene propylene diene monomer (EPDM) rubber and the epoxy resin of the second substrate comprises an aliphatic epoxy resin based composite material including fibrous elements therein.

29. An article comprising:
a first substrate comprising at least one rubber;
a second substrate comprising at least one epoxy resin; and
at least one acrylate disposed between at least a portion of the first substrate and at least a portion of the second substrate, wherein at least a portion of the at least one acrylate is diffused into at least a portion of the at least one rubber of the first substrate.

30. The article of claim 29, further comprising:
an interfacial layer comprising at least one acrylate interspersed between at least a portion of a selected bonding surface of the first substrate and at least a portion of a selected bonding surface of the second substrate.

31. The article of claim 29, wherein:
the first substrate and the second substrate are cured to bond the first substrate and the second substrate via the at least one acrylate.

32. The article of claim 29, wherein the at least one rubber of the first substrate comprises a synthetic rubber.

33. The article of claim 29, wherein the at least one rubber of the first substrate comprises a natural rubber.

34. The article of claim 29, wherein the at least one rubber of the first substrate comprises ethylene propylene diene monomer (EPDM) rubber.

35. The article of claim 29, wherein the at least one epoxy resin of the second substrate comprises an aliphatic epoxy resin based composite material.

36. The article of claim 29, wherein the at least one epoxy resin of the second substrate comprises an epoxy resin based composite material having fibrous elements therein.

37. The article of claim 29, wherein the first substrate further comprises at least one of the group consisting of silica and an aramid.

38. The article of claim 29, wherein the at least one rubber of the first substrate comprises an unvulcanized ethylene propylene diene monomer (EPDM) rubber and the epoxy resin of the second substrate comprises an aliphatic epoxy resin based composite material including fibrous element therein.

39. The article of claim 29, further comprising an interfacial layer disposed between at least a portion of the first substrate and at least a portion of the second substrate, the interfacial layer comprising:

at least one rubber constituent selected from the group consisting of a natural rubber and a synthetic rubber; and the at least one acrylate selected from the group consisting of a mono-functional acrylate, a poly-functional acrylate, an acrylate derivative, a methacrylate, glycidyl methacrylate, trimethylol ropane trimethacrylate, and pentaerythritol triacrylate.

40. The article of claim 30, wherein the interfacial layer further comprises:

at least one rubber constituent, wherein the at least one rubber constituent and the at least one acrylate are each present in a preselected percentage by weight relative to the total amount of the at least one rubber constituent and the at least one acrylate.

41. The article of claim 40, wherein the preselected percentage by weight of the at least one rubber constituent to the at least one acrylate of the interfacial layer ranges from approximately 95% rubber constituent and approximately 5% acrylate to approximately 5% rubber constituent and approximately 95% acrylate.

42. The article of claim 40, wherein the preselected percentage by weight of the at least one rubber constituent to the at least one acrylate ranges from approximately 30% rubber constituent and approximately 70% acrylate to approximately 70% rubber constituent and approximately 30% acrylate.

43. A component of a rocket motor, comprising:

a first substrate comprising at least one flame resistant rubber material;

a second substrate comprising an epoxy resin; and an interfacial layer comprising at least one acrylate and at least one rubber constituent disposed between at least a portion of the first substrate and at least a portion of the second substrate, wherein the at least one rubber constituent and the at least one acrylate are each present in a preselected percentage by weight that ranges from approximately 95% rubber constituent and approximately 5% acrylate to approximately 5% rubber constituent and approximately 95% acrylate.

* * * * *

UNITED STATES PATENT AND TRADEMARK OFFICE
CERTIFICATE OF CORRECTION

PATENT NO.     : 6,495,259 B1
DATED          : December 17, 2002
INVENTOR(S)    : Alan I. Kasner It is certified that error appears in the above-identified patent and that said Letters Patent is hereby corrected as shown below:

<u>Title page,</u>
Item [56], References Cited, FOREIGN PATENT DOCUMENTS, delete
"EP     0486044 A2     11/1991"

<u>Column 1,</u>
Line 32, change "extents" to -- extent, --
Lines 64-65, change "islinitially" to -- is initially --

<u>Column 3,</u>
Line 22, delete the colon after "characteristics"
Line 51, delete the comma after "shear"

<u>Column 4,</u>
Line 21, insert a comma after "236"

<u>Column 5,</u>
Line 9, change "Art" to -- art --
Line 25, after "boron fibers," insert -- and --
Line 43, change "rhono-functional" to -- mono-functional --

<u>Column 6,</u>
Line 4, change "Accordance" to -- accordance --
Line 67, change "LO" to -- to --

<u>Column 7,</u>
Line 2, delete the comma after "material"
Line 33, change "maybe" to -- may be --
Line 45, after "that" and before the comma insert -- a solvent --
Line 46, change "a solvent" to -- it --

<u>Column 8,</u>
Line 1, change "acrylate" to -- "acrylate" --
Line 3, delete the comma after "derivative"
Line 13, delete the comma after "acrylates"
Line 24, insert a comma after "is"
Line 36, delete the comma after "terpene"
Line 61, insert a comma after "compounds"

UNITED STATES PATENT AND TRADEMARK OFFICE
CERTIFICATE OF CORRECTION

PATENT NO. : 6,495,259 B1
DATED : December 17, 2002
INVENTOR(S) : Alan I. Kasner It is certified that error appears in the above-identified patent and that said Letters Patent is hereby corrected as shown below:

Column 9,
Line 29, insert a comma after "solvent"
Line 30, delete the comma after "14'
Line 31, delete the comma after "provided"
Line 57, change "case" to -- rocket motor --

Column 10,
Line 5, change "of the present" to -- with the present --
Line 30, delete the comma after "collapsible"
Lines 36 and 44, delete the comma after "16"
Line 40, delete the comma after "20"
Line 47, change "substrates" to -- substrate layer --

Column 11,
Line 44, after "200" change "to" to -- and --
Line 45, after "(1387" change "to" to -- and --
Line 45, change "adhesive type" to -- adhesive-type --
Line 49, after "500" change "to" to -- and --
Line 50, after "3447" change "to" to -- and --
Line 64, change "precured prevulcanized," to -- precured, or prevulcanized, --

Column 12,
Line 21, change "subtrate" to -- substrate --

Column 15,
Line 5, change "element" to -- elements --
Line 17, change "trimethylol ropane" to -- trimethylolpropane --

Signed and Sealed this

Eighth Day of June, 2004

JON W. DUDAS
*Acting Director of the United States Patent and Trademark Office*